United States Patent [19]
Ito et al.

[11] Patent Number: 5,300,763
[45] Date of Patent: Apr. 5, 1994

[54] INFORMATION RECORDING/REPRODUCING APPARATUS

[75] Inventors: Junichiro Ito; Yoshiyuki Yamamori, both of Tokyo, Japan

[73] Assignee: Olympus Optical Co., Ltd., Tokyo, Japan

[21] Appl. No.: 800,569

[22] Filed: Nov. 27, 1991

[30] Foreign Application Priority Data

Nov. 30, 1990 [JP] Japan ................. 2-338628
Nov. 30, 1990 [JP] Japan ................. 2-340933

[51] Int. Cl.$^5$ ............................................. G06K 13/04
[52] U.S. Cl. ................................... 235/475; 369/77.1
[58] Field of Search ................... 369/77.1, 77.2;
360/99.02, 99.03, 99.06, 99.07, 96.5; 235/475, 482, 477, 480

[56] References Cited

U.S. PATENT DOCUMENTS

| | | | |
|---|---|---|---|
| 3,766,687 | 10/1973 | Henson | 235/482 |
| 4,150,784 | 4/1979 | Moorman et al. | 235/480 |
| 4,454,599 | 6/1984 | Tsuchiya | 369/77.2 |
| 4,675,858 | 6/1987 | d'Alayer de Costemore d'Arc | 369/77.1 |
| 4,803,349 | 2/1989 | Sugimoto et al. | 235/475 |
| 4,931,622 | 6/1990 | Ohtsuki et al. | 235/482 |
| 5,086,422 | 2/1992 | Hagiya et al. | 369/77.1 |
| 5,146,070 | 9/1992 | Toma | 235/475 |
| 5,179,504 | 1/1993 | Kitahara | 235/475 |

FOREIGN PATENT DOCUMENTS

| | | |
|---|---|---|
| 56-105171 | 8/1981 | Japan . |
| 57-29958 | 2/1982 | Japan . |
| 60-247881 | 12/1985 | Japan . |
| 62-164687 | 10/1987 | Japan . |
| 64-72353 | 3/1989 | Japan . |

OTHER PUBLICATIONS

IBM Technical Disclosure Bulletin, Lewis et al., Unidirectional Gate for Card Readers, Jan. 1972, vol. 14, No. 8.

*Primary Examiner*—Robert S. Tupper
*Assistant Examiner*—Paul J. Ditmyer
*Attorney, Agent, or Firm*—Frishauf, Holtz, Goodman & Woodward

[57] ABSTRACT

An information recording/reproducing apparatus is provided with a shutter mechanism for closing and opening an insertion slot formed on a wall of a housing to insert/eject an information recording medium into/from the housing. The shutter mechanism includes a first member which is movable in a first direction perpendicular to a second direction in which the information recording medium is inserted into the slot of the housing, the first member being movable between a slot open and a slot closed position. A second member is fixed on the housing and is selectively either contacting the first member in the slot closed position or being spaced away from the first member in the slot open position. A slanted surface, which is slanted or inclined with respect to the first and the second directions, is formed on the first member such that the first and second members contact each other on the slanted surface when the first member is in the slot closed position. A seal member, made of elastic material, is preferably fixed to the slanted surface for sealing the slot when the slot is closed. The slanted surface has a recess which has an abutment surface almost vertical to the second direction, so as to effectively block entry of an information recording medium when the slot is closed.

10 Claims, 8 Drawing Sheets

INFORMATION RECORDING/REPRODUCING APPARATUS

FIELD OF THE INVENTION

1. Field of the Invention

The present invention relates to an information recording/reproducing apparatus which records or reproduces information on or from an information recording medium.

2. Description of the Related Art

The apparatus generally comprises a housing having a front wall in which an insertion slot is formed. The insertion slot is opened and closed by a shutter mechanism located in the housing.

A known conventional type of the shutter mechanism is disclosed in, for example, Japanese Unexamined Patent Publication No. 60-247881. This shutter mechanism has a shutter rotatable in a direction where a recording medium is to be inserted, or in an inserting direction. The shutter is operated by an electric element, e.g. a sensor or a solenoid, to open or close the insertion slot, when the recording medium is to be inserted or ejected.

In a shutter mechanism disclosed in Japanese Unexamined Utility Model Publication No. 56-105171, as shown in FIG. 12, a shutter 150 is attached inside a front wall 154 of a housing 152 by a spring member 156 consisting of a pressure spring, to be capable of sliding in the direction perpendicular to the card inserting direction for closing an insertion slot 158.

When an optical card 2 is inserted into the housing 152, the shutter 150 is pushed up by the inserting force of the optical card 2 and the insertion slot 158 opens. When the optical card 2 has been completely inserted in the housing 152, the shutter 150 is pushed down by the recovery force of the spring 156 and the insertion slot 158 closes. The optical card 2 is then transferred to the inside of the housing 152 by a feed roller 160 and an opposed roller 162, so that information is to be recorded or reproduced by an optical head (not shown).

In a shutter mechanism disclosed in Japanese Unexamined Utility Model Publication No. 57-29958 as shown in FIG. 13, a damper 161 for absorbing the impact of closing the shutter 150 is securely attached to the upper surface of the insertion slot 158 on which a pressing portion 150a at the top of the shutter 150 abuts. Photointerrupters 166a and 166b detecting the insertion of the optical card 2 are embedded in the front wall 154 of the housing 152 to activate a solenoid 164 driving the shutter 150

In this shutter mechanism, the photointerrupters 166a and 166b detect that the optical card 2 is inserted, and then a current is supplied to the solenoid 164. The shutter 150 is opened against the urge of a spring 168. When inserting the optical card 2 is completed, the current supply to the solenoid 164 is stopped, thus closing the shutter 150 by the force of the spring 168. The current supply is controlled by an exclusive circuit in this case.

Although the shutter mechanism in the first publication is effective as an opening/closing mechanism, it does not have an excellent dust-proof effect which has presently been one of the issues in the field of current optical information recording. In this shutter mechanism, even if the shutter is closed air might come in from a gap between the shutter and the shutter holder, or between the shutter and the insertion slot to carry dust deeply inside the housing.

The shutter mechanism in the second publication has a clearance between the top of the shutter 150 and the lower surface of the insertion slot 158, or a clearance 170 inside the front wall 154 of the housing 152 to allow the shutter 150 to move up and down. This shutter mechanism like the one disclosed in the first publication will permit the dust-carrying air to enter inside even while the shutter is closed.

The shutter mechanism in the third publication hardly has a gap between the pressing portion 150a and the damper 161. This shutter mechanism however includes gaps between both sides of the insertion slot 15 and those of the shutter 150 and a space 172 between the front lower surface of the shutter 150 and the rear lower surface of the insertion slot 158. The dust-carrying air therefore enters inside the housing, as per the first and second publications.

SUMMARY OF THE INVENTION

It is therefore an object of the present invention to provide an information recording/reproducing apparatus which blocks the air flow into a housing and prevents dust from entering inside, thus improving the dust-proof effect.

According to the present invention, an information recording/reproducing apparatus is provided with a shutter mechanism for closing and opening an insertion slot formed on a wall of a housing to insert/eject an information recording medium into/from said housing. The shutter mechanism comprises a first member movable in a first direction perpendicular to a second direction in which said information recording medium is inserted into said slot of said housing, said first member being movable between a slot open and a slot closed position; a second member fixed on said housing and selectively either contacting said first member in said slot closed position or being spaced away from said first member in said slot open position; and a slanted surface which is slanted or inclined with respect to said first and second directions, said slanted surface being formed on said first member, and said first and second members contacting each other on said slanted surface when said first member is in said slot closed position.

The apparatus further preferably comprises a seal member made of elastic material fixed to said slanted surface for sealing said slot when said slot is closed. The slanted surface preferably has a recess formed therein, said recess having an abutment surface almost vertical to said second direction, so as to effectively block entry of an information recording medium when said slot is closed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An information recording/reproducing apparatus according to a first preferred embodiment of the present invention will now be described in detail referring to FIGS. 1 and 2.

Figure 1:
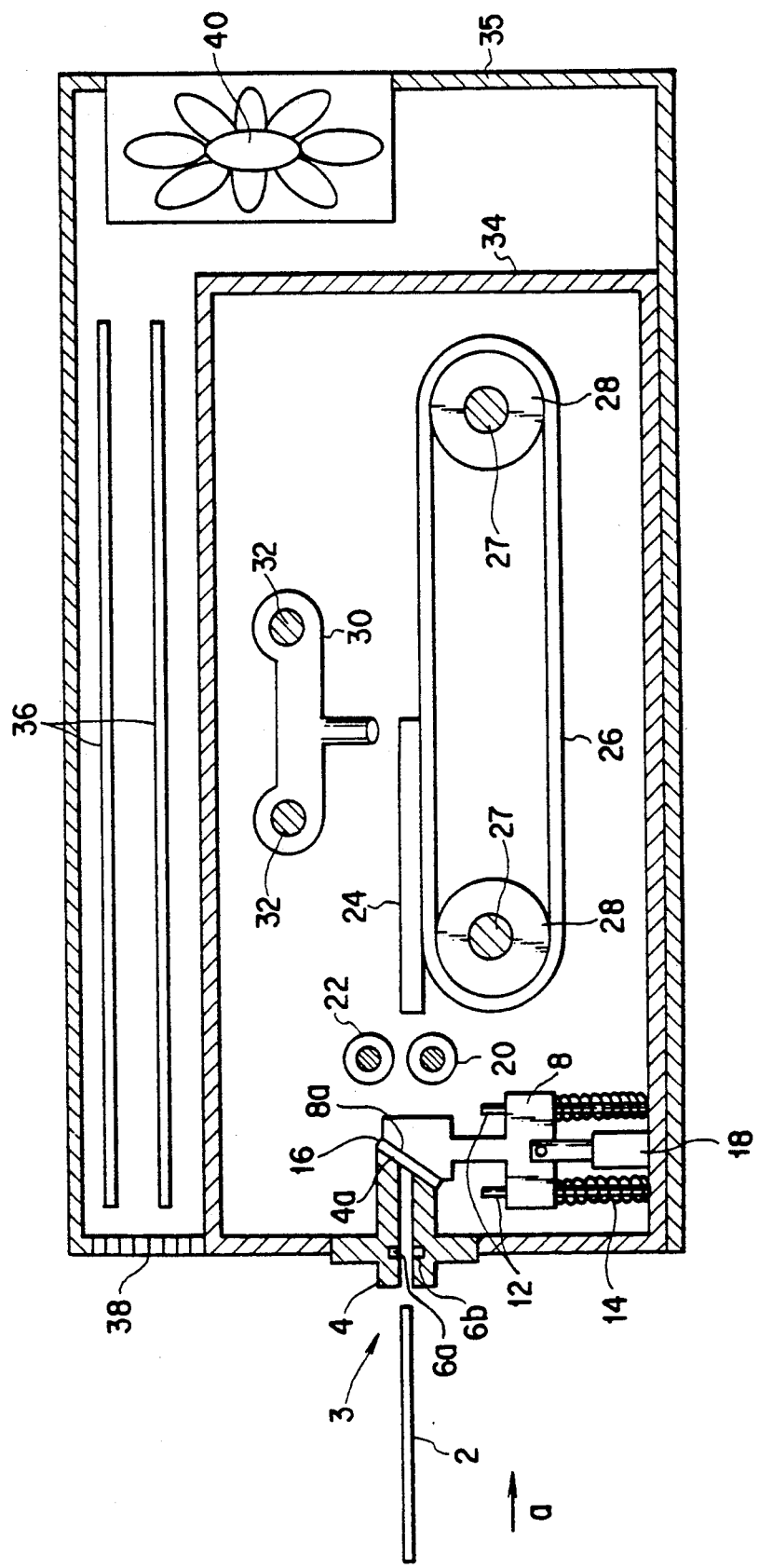
FIG. 1 is a cross section of an information recording-/reproducing apparatus according to the first embodiment of the present invention.
Figure 2:
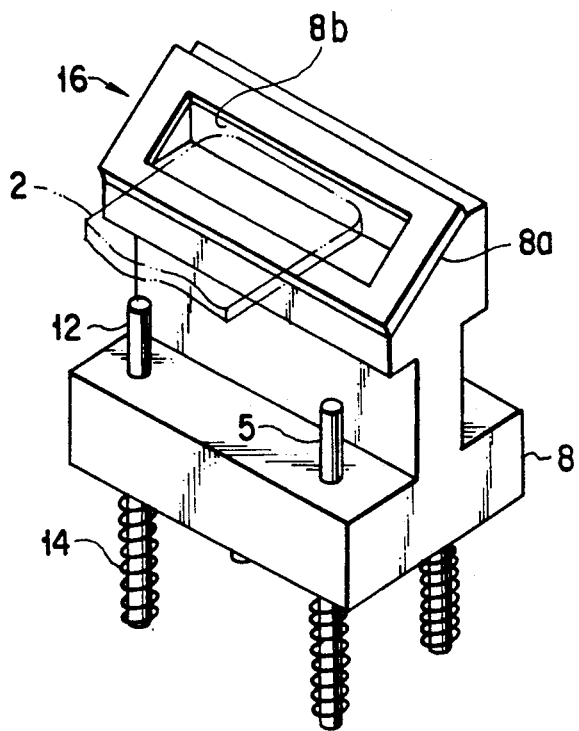
FIG. 2 is a perspective view of a shutter in the information recording/reproducing apparatus in FIG. 1.

A card inserting portion 4 including an insertion slot 3 for an information recording medium, for example, an optical card 2 is provided in the front wall of an inner housing 34 in the information recording/reproducing apparatus, as shown in FIG. 1. A pair of photointerrupters 6a and 6b are located on the upper and lower walls of the card inserting portion 4 to detect the insertion of the optical card 2. The photointerrupters 6a and 6b, when detecting the insertion or ejection of the optical card 2, drive a solenoid 18 to be described later and various other conveying means though a predetermined drive circuit (not shown).

The card inserting portion 4 has forward and backward protrusions to guide the optical card 2 to a conveying path. The distal end of the backward protrusion of the card inserting portion 4 has an inclined surface 4a tilting at approximately 45 degrees to the direction of inserting the optical card 2 (direction indicated by the arrow a in the drawing). Under the inclined surface 4a of the card inserting portion 4 is located a shutter 8 which has an inclined surface 8a tilting at approximately 45 degrees so as to meet the surface 4a. These inclined surfaces 4a and 8a constitute part of the blocking means.

The inclined surface 8a of the shutter 8 is large enough to cover the slot completely. A thin elastic member 16 with an opening in the center part is provided around the inclined surface 8a of the shutter 8. The elastic member 16 constitutes not only a sealing member but also part of the blocking means.

Figure 3:
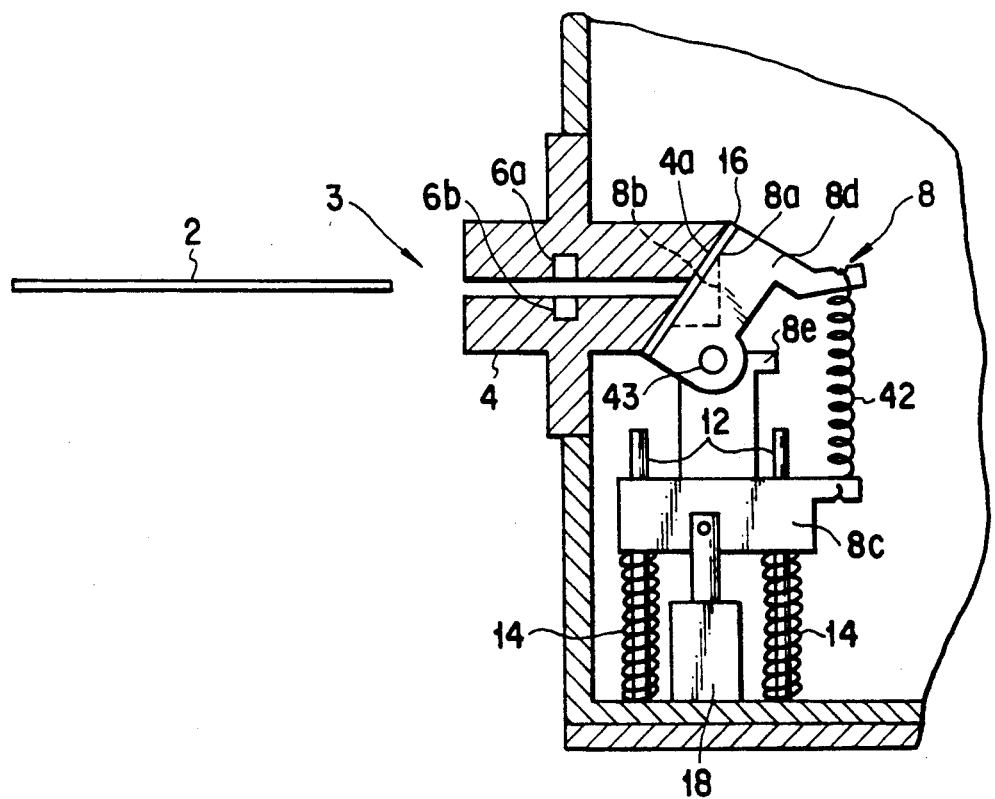
FIG. 3 is a partial cross section illustrating the first modification of the shutter mechanism in the apparatus according to the first embodiment and a slot section of the apparatus.

The opening in the center of the elastic member 16 is formed in the perpendicular direction to the inclined surface 8a and has a sufficient area to cover the slot 3. Moult plane, or elastic rubber is preferably used for the elastic member 16. Along the inclined surface 8a of the shutter 8 corresponding to the opening of the elastic member 16, an abutment portion 8b is formed in the direction perpendicular to the inserting direction of the optical card 2 and blocks entry of the optical card 2 when the slot is closed, as shown in FIGS. 2 and 3.

Below the shutter 8 are provided four through holes. Four guides 12 vertically protrude from the bottom wall of the inner housing 34 in association with these four through holes. Four springs 14 each constituted of a pressure coil spring are loosely fitted on the respective guides 12. The four guides 12 are inserted into the through holes of the shutter 8. Accordingly, the shutter 8 can move up and down along the guides 12, and is always urged upward by the springs 14.

The lower portion of the shutter 8 is coupled to the solenoid 18, which is electrically connected to the photointerrupters 6a and 6b via the drive circuit.

The shutter 8, guides 12, springs 14 and solenoid 18 constitute a shutter mechanism (shutter means) which opens and closes the slot 3.

At the back of the shutter 8 or at the back of the card inserting portion 4 is provided a feed roller 20 and an opposed roller 22 which constitute part of conveying means to convey the optical card 2. These rollers 20 and 22 are supported on the inner housing 34 to be rotatable around a horizontal axis perpendicular to the conveying path. The feed roller 20 is driven by a motor (not shown) which will be activated by a signal sent through the predetermined drive circuit from the photointerrupters 6a and 6b upon detection of the insertion of the optical card 2. The opposed roller 22 is provided freely rotatable above the feed roller 20, and feeds the optical card 2 onto the conveying path while holding the card 2 together with the feed roller 20. At the back of those rollers, another photointerrupters (not shown) are provided which drive the solenoid 18 and various conveying means through a predetermined drive circuit in accordance with the insertion and discharging of the optical card 2.

A tray 24 on which the optical card is securely placed at the time of information recording and/or reproduction is provided on the conveying path at the back of the feed roller 20 and opposed roller 22. This tray 24 is fixed on a belt 26, which is put around two pulleys 28 provided at the front and back of the apparatus. These pulleys 28 are formed on shafts 27 provided rotatable around a horizontal axis perpendicular to the conveying direction. The belt 26, pulleys 28 and shafts 27 constitute part of the conveying means to convey the optical card 2, and are driven by drive means (not shown). The tray 24 is therefore movable in the conveying direction.

An optical head 30 is provided above the belt 26 at almost the mid point between the two pulleys 28 The optical head 30 is movable via two shafts 32 in the direction perpendicular to the conveying direction. The movement of the optical head 30 is controlled by control means (not shown) in accordance with the recording and/or reproduction of information. The optical head 30 constitutes a drive mechanism (recording/reproducing means), together with the feed roller 20, opposed roller 22, belt 26, pulleys 28 and shafts 27, which constitute the conveying means, and is retained almost air tight in the inner housing 34. The other members, such as the shutter 8, solenoid 18 and card inserting portion 4 are likewise retained almost air tight in the inner housing 34.

The inner housing 34 is covered with an outer housing 35. Above the outer housing 35 are located two electric printed board 36 on which the predetermined drive circuits to drive the drive mechanism are printed. An air inlet 38 for introducing air between the inner housing 34 and outer housing 35 is formed in the upper front surface of the outer housing 35. At the back of the inner housing 34 a cooling fan 40 which permits the flow of air from the air inlet 38 to cool the drive mechanism and the electric printed boards 36 is provided on the rear wall of the outer housing 35.

A description will now be given of the action of the information recording/reproducing apparatus according to the first embodiment with the above structure.

When the optical card 2 is not present in the inner housing 34, the shutter 8 is closed as shown in FIG. 1. As the optical card 2 is inserted through the slot 3 in this condition, the photointerrupters 6a and 6b detects the insertion of the card and outputs detection signals to the circuits on the electric printed boards 36. The circuits in turn supply a current to the motor (not shown) to drive the solenoid 18 and the feed roller 20. The excited solenoid 18 contracts to lower the shutter 8 against the urging force of the springs 14. The feed roller 20 will rotate in such a direction as to convey the optical card 2 toward the back of the apparatus or clockwise in the diagram. With the leading end of the inserted optical card 2 being held between the feed roller 20 and opposed roller 22, the optical card 2 is carried to be placed on the tray 24 by these rollers 20 and 22.

At this time, other photointerrupters (not shown) provided at the back of the feed roller 2 and opposed roller 22 detect the back end of the optical card 2 and output detection signals to the mentioned circuits. When the control means confirms that the optical card 2 has entered the inner housing 34 completely, it causes the drive circuit to stop exciting the solenoid 18. And the shutter 8 is moved upward against the pressing force of the springs 14.

Consequently, the inclined surface 8a of the shutter 8 presses the elastic member 16 against the inclined surface 4a of the card inserting portion 4, and the inclined surface 4a meets the elastic member 16 to closes the slot 3. As a result, dust-containing air from the slot 3 is completely blocked. The inner housing 34 excluding the slot portion 3 completely covers the drive mechanism in an air tight condition, also preventing dust-containing air from entering from the slot 3. With the optical card already present in the inner housing 34, if one tries to insert another optical card 2 with force, this force will act only in the horizontal direction or conveying direction on vertical abutment portion 8b and will not act in the vertical direction, thus preventing the shutter 8 to move downward to open the slot 3 against the urging force of the springs 14.

The optical card 2 carried inside the inner housing 34 will be placed on the tray 24 by the feed roller 20 and the opposed roller 22. Then, the pulleys 28 and belt 26 are driven to convey the optical card in the conveying direction, and the optical head 30 is driven in the direction perpendicular to the conveying direction along the shafts 32 by the control means and drive means (neither shown). in this manner Information will be recorded and/or reproduced on and/or from the optical card 2 while moving the optical card 2 in the conveying direction and moving the optical head 30 in the direction perpendicular to the conveying direction.

When the information recording and/or reproduction on and/or from the optical card 2 is completed, the feed roller 20 is rotated in the direction to move the optical card 2 toward the slot 3 at the front of the apparatus or counterclockwise in FIG. 1 in response to signals from the drive circuits on the electric printed boards 36. The tray 24 then moves toward the front of the apparatus to cause the leading end of the optical card 2 to be held between the feed roller 20 and opposed roller 22.

When the photointerrupters (not shown) detect that the optical card 2 has been held between the feed roller 20 and opposed roller 22, the photointerrupters output detection signals to the circuits on the electric printed boards 36 to supply a current to the solenoid 18. The excited solenoid 18 moves the shutter downward against the urging force of the springs 14 to thereby open the slot 3.

The optical card 2 held between the feed roller 20 and opposed roller 22 is carried toward the slot 3 and the rear end of the optical card 2 will be detected by the photointerrupters (not shown). The leading end of the optical card positioned there protrudes from the card inserting portion 4. These photointerrupters output signals for stopping the rotation of the feed roller 20 to the mentioned circuits to stop rotating the roller 20.

When the user holds the front end of the optical card 2 protruding from the card inserting portion 4 and pulls it out, the photointerrupters 6a and 6b at the card inserting portion 4 detect the passing of the card 2, and send detection signals to the aforementioned circuits to stop exciting the solenoid 18. As the solenoid 18 is deexcited, the shutter 8 moves upward due to the urging force of the springs 14, thus closing the slot 3. When the slot 3 is closed, the interior of the inner housing 34 is perfectly sealed air tight, thus completely blocking the flow of dust-carrying air.

According to this embodiment, as the elastic member 16 of the inclined surface 8a of the shutter 8 meets the inclined surface 4a of the card inserting portion 4, the slot 3 is closed so that the whole drive mechanism can be completely sealed air tight. This can prevent dust-carrying air from entering the apparatus and can reduce the reduction of the light intensity due to some stain on the optical head 30, thus ensuring accurate and stable information recording and/or reproduction over a long period of time. Further, the provision of the protruding abutment portion 8b in the center portion of the shutter 8 can surely prevent insertion of more than one card.

The shutter mechanism in the apparatus according to this embodiment may be designed as in a first modification which will be discussed below.

In this modification, the shutter is separated into a first shutter portion 8c and a second shutter portion 8d which are rotatably coupled together by means of a pin 43. The upper portion of the second shutter portion 8d and the lower portion of the first shutter portion 8c are urged by a coil A42 constituted of an extension spring. The urging force of this spring A42 is sufficiently weaker than that of the springs 14. A stopper 8e for restricting the rotation of the second shutter portion 8d is formed at the upper portion of the first shutter portion 8c.

The action of the shutter 8 having the above structure will be described below. When a current is supplied to the solenoid 18 with the slot 3 closed, the solenoid 18 contracts to pull the first shutter portion 8c downward. The downward movement of the first shutter portion 8c causes the second shutter portion 8d to rotate around the pin 43 by the urging force of the spring A42, thus opening the slot 3 while the lower portion of the elastic member 16 of the inclined surface 8a is abutting on the lower portion of the card inserting portion 4. At this time the second shutter portion 8d is inhibited from rotating more than necessary by the stopper 8e. To close the slot 3, the current supply to the solenoid 18 should be stopped. The first shutter portion 8c then moves upward due to the urging force of the springs 14 and the second shutter portion 8d causes the inclined surface 4a to meet the elastic member 16 against the pulling force of the spring A42, thereby closing the slot 3.

Since the urging force of the spring A42 is sufficiently weaker than that of the springs 14 as mentioned above, the slot 3 can surely be closed. The action of the other members are the same as that of the first embodiment, so its description will be omitted.

According to the structure of the shutter 8 in the first embodiment, the shutter 8 moves linearly, necessitating that the angle of the inclined surface 4a of the card inserting portion 4 should accurately coincide with the angle of the inclined surface 8a of the shutter 8. The use of the modified shutter mechanism however eliminates the need to precise adjustment of the angles of the inclined surfaces, facilitating the production of the apparatus and reducing the manufacturing cost accordingly. As it is sufficient to move the shutter 8 slightly downward, shortening the up-and-down stroke of the shutter 8, a smaller solenoid 18 can be used. This contributes to the power saving and cost reduction.

A second modification will now be described referring to FIGS. 4 and 5.

In this modification, the upper portion of the shutter 8 in the first embodiment is attached rotatable to one end portion of a rotatable lever 46.

A protrusion 47 horizontally protrudes from the proximal end of the elongated thin lever 46. The distal end of a return spring 50, constituted of an extension spring, is secured to the protrusion 47. The proximal end of this spring 50 is secured to the bottom wall o the inner housing 34.

A through hole is formed in the proximal end of the lever 46, with a center shaft 48 fitted in the hole. Both ends of the center shaft 48 are fixed to the housing 34, so that the lever 46 is rotatable around the center shaft 48.

Figure 4:
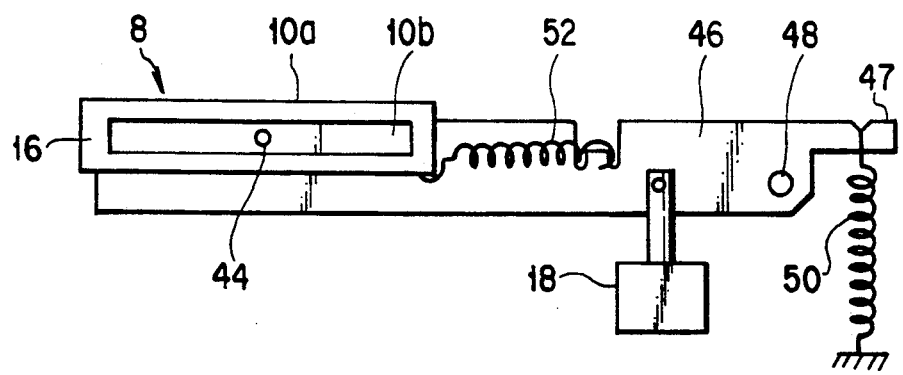
FIG. 4 is a front view of the second modification of the shutter mechanism.

Referring to FIG. 4 the distal end of the solenoid 18 is attached to the lever 46 on the left side of the pin 44.

The distal end of the lever 46 is provided with the shutter 8. A through hole is formed nearly in the center of the shutter 8, with the distal end of a pin 44 fitted in the hole. The proximal end of the pin 44 is secured to the lever 46, so that the shutter 8 is rotatable with respect to the lever 46.

Referring to FIG. 4 a neutral spring 52 constituted of an extension spring has its distal end attached to the right end of the shutter 8, with its proximal end attached to the lever 46. The urging force of the neutral spring 52 is set weaker than that of the return spring 50.

Figure 5:
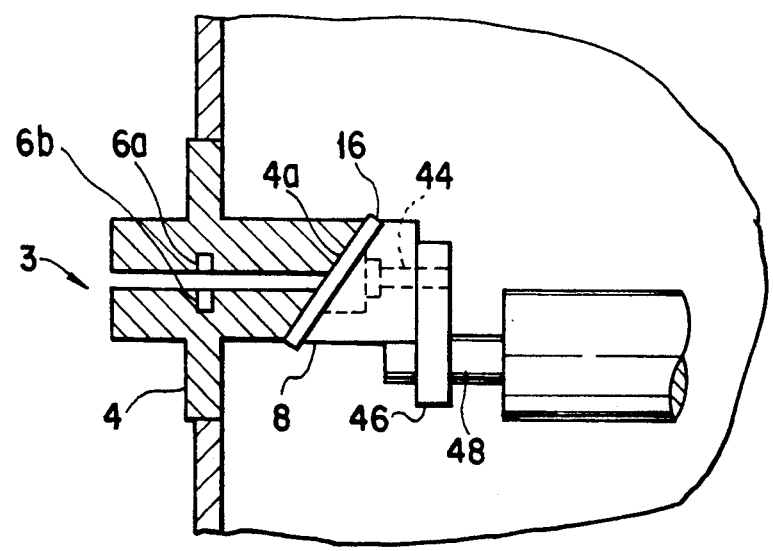
FIG. 5 is a partial cross section showing the second modification of the shutter mechanism and a slot section of the apparatus.

The solenoid 18, the return spring 50 and the neutral spring 52 are not shown in FIG. 5 for diagrammatical simplicity.

When the solenoid 18 is excited, it contracts to rotate the lever 46 counterclockwise around the center shaft 48 against the urging force of the return spring 50, thus opening the slot 3. Since unnecessary rotation of the shutter 8 is suppressed by the neutral spring 52 at this time, the shutter 8 will not rotate to close the slot 3.

When the current supply to the solenoid 18 is stopped, the lever 46 rotates clockwise due to the urging force of the return spring 50, permitting the inclined surface 8a of the shutter 8 to meet the inclined surface 4a of the card inserting portion 4, thereby closing the slot 3. At this time the elastic member 16 is pressed against the inclined surface 4a of the card inserting portion 4 by the force of the return spring 50. Since the urging force of the neutral spring 52 is sufficiently weaker than that of the return spring 50, the inclined surface 8a of the shutter 8 closely contacts the inclined surface 4a of the card inserting portion 4.

According to the second modification, as the shutter 8 supported on the lever 46 is rotatable around the rotational pin 44, it becomes easier for the shutter 8 to closely contact the inclined surface 4a of the card inserting portion, thus eliminating the need for accurate adjustment of the angles of both inclined surfaces. This facilitates the production of the apparatus and reduces the manufacturing cost. Further, because the shutter 8 is opened or closed by the rocking movement of the lever 46, the movement of the shutter 8 becomes smoother.

An information recording/reproducing apparatus according to the second embodiment will now be described referring to FIGS. 6 to 8. The apparatus in this embodiment differs from the apparatus of the first embodiment in the position of the elastic member 16 and the structure of the shutter mechanism which operates the shutter 8. Only the vicinity of the slot 3 is therefore shown in this embodiment, while the drive mechanism and the members outside of the inner housing 34 are omitted. The same reference numerals are used to indicate the components in the second embodiment corresponding to those in the first embodiment to explain only different components.

Figure 6:
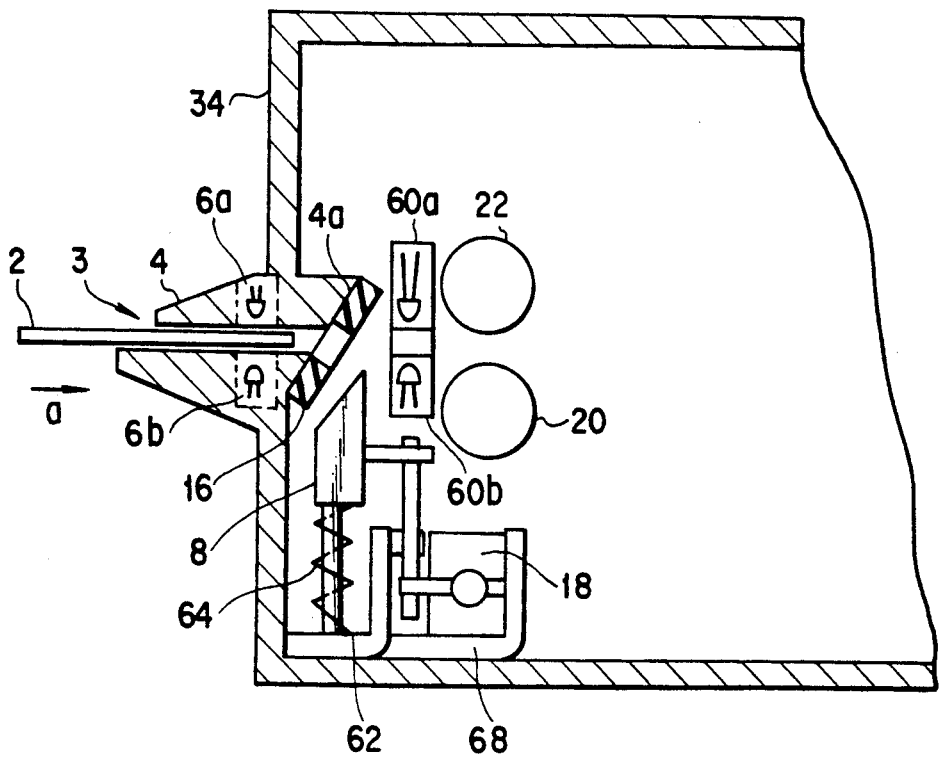
FIG. 6 is a partial cross section illustrating a shutter being opened in an information recording/reproducing apparatus according to the second embodiment of the present invention.
Figure 7:
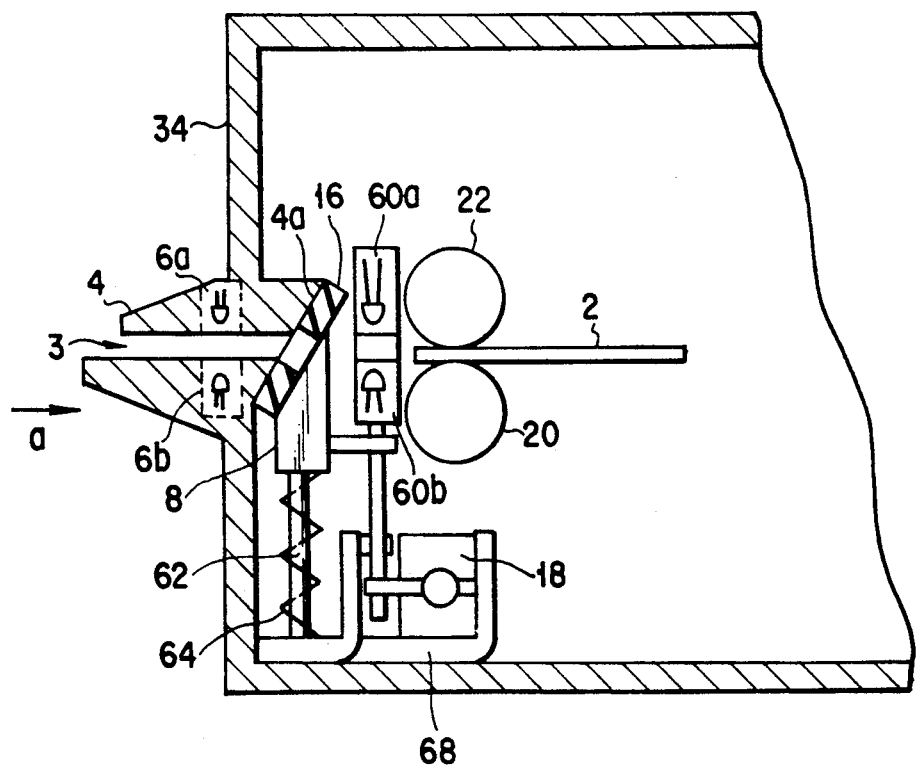
FIG. 7 is a partial cross section showing the shutter in FIG. 6 being closed.

As shown in FIGS. 6 and 7, the opening of the elastic member 16 is formed in the direction perpendicular to the inclined surface 4a. Forming the opening in this manner can restrain dust from entering the slot 3.

Photointerrupters 60a and 60b are located between the elastic member 16 and a pair of the feed roller 20 and the opposed roller 22. For the convenience sake, the photointerrupters 6a and 6b provided in the card inserting portion 4 will be explained as the first photointerrupters 6a and 6b, and the photointerrupters 60a and 60b as the second photointerrupters 60a and 60b in this embodiment.

Figure 8:
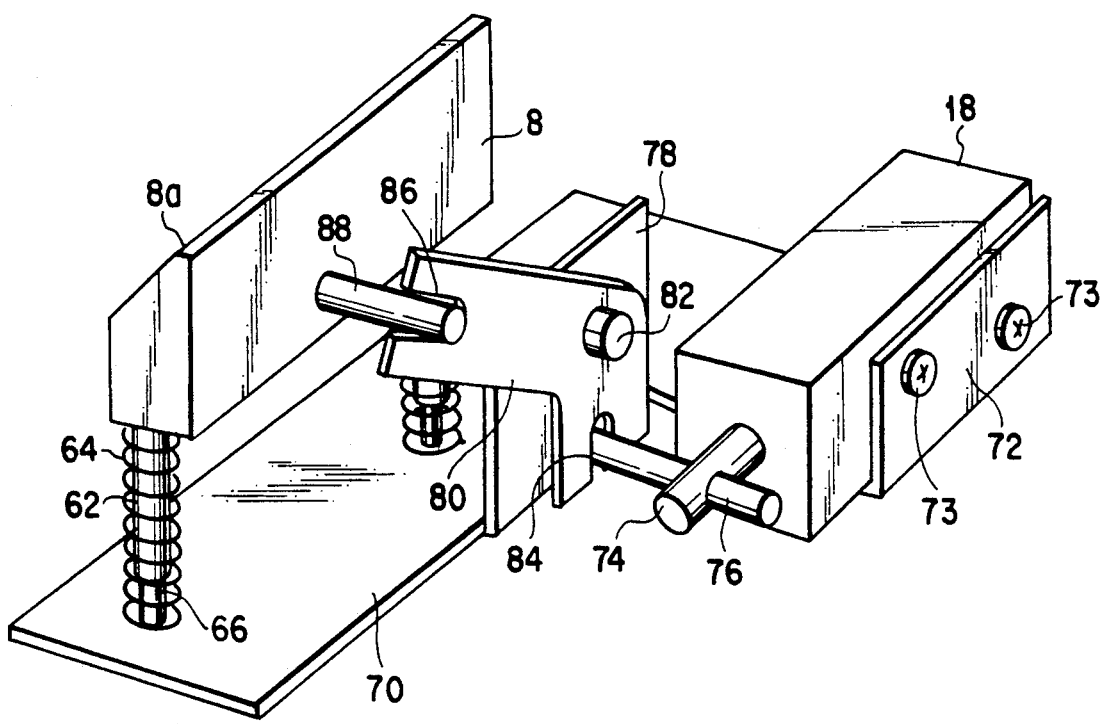
FIG. 8 is a perspective view of a shutter mechanism according to the second embodiment.

The shutter 8 has two cylindrical leg portions 62 provided on the bottom surface as shown in FIG. 8. The leg portions 62 of the shutter 8 are inserted in respective coil springs 64 each consisting of a helical compression spring. The leg portions 62 are fitted over respective guides 66.

These two guides 66 are protruded on a flat surface 70 of a base plate 68 formed of a pressed thin plate. The base plate 68 is secured on the bottom surface of the inner housing 34 as shown in FIG. 6. The solenoid 18 is secured to a first fixing portion 72 of the substrate 68 by a screw 73 as shown in FIG. 8. A core 74 extends through the solenoid 18. A bar 76 is attached to the core 74 to face a second fixing portion 78 of the base plate 68.

A lever 80 is provided around an axis 82 on the second fixing portion 78 to be rotatable. At one end of the lever 80 is formed a first notch 84 into which the distal end of the bar 76 is inserted.

The lever 80 has a second notch 86 at the other end, and a bar 88 protruding from the rear surface of the shutter 8 is inserted thereto.

The shutter mechanism is structured in such a manner that the shutter 8 is provided to communicate with the solenoid 18, so that the shutter 8 can lift and shut by exciting the solenoid 18.

The protruding abut portion 8b of the shutter 8 is not shown to simplify the diagrams.

The action of the thus structured i formation recording/reproducing apparatus according to the second embodiment will now be described below.

When the shutter 8 is closed as shown in FIG. 7, no current is supplied to the solenoid 18. The shutter 8 is lifted up by the urging force of the coil springs 64 to close the slot 3 with the elastic member 16, thus blocking the air flow into the apparatus. FIG. 7 shows when the optical card 2 is inserted in the apparatus. If the optical card 2 is inserted in the slot 3 of the apparatus where no optical card 2 is present, the first photointerrupters 6a and 6b detect the insertion of the optical card 2. The photointerrupters 6a and 6b, after detecting the card insertion, activates the solenoid 18 and a motor (not shown) which drives the feed roller 20 through a predetermined circuit. The excited solenoid 18 attracts the core 74, which in turn pulls the bar 76 in so as to turn the lever 80 counterclockwise on the axis 82 on the view of FIG. 8. As the lever 80 turns counterclockwise, the rod 88 of the shutter is accordingly moved down through the second notch 86. The downward movement of the rod 88 presses the shutter 8 down along the guides 66 against the force of the coil springs 64, opening the slot 3. The opposed roller 22 and the feed roller 20 which is driven by the first photo interrupters 6a and 6b via the predetermined circuit hold the distal end of the optical card 2, and feed the card 2 into the interior of the apparatus. When the second photointerrupters 60a and 60b detect that inserting the optical card 2 is completed, the solenoid 18 and the motor (not shown) which drives the feed roller 20 are rendered off through the predetermined circuit. The solenoid 18, when not excited, extends out the core 74 to push the bar 76. When the bar 76 is pushed out, the lever 80 turns clockwise on the axis 82, lifting the rod 88 of the shutter 8 through the second notch 86. The shutter 8 elevates along the guides 66 according to the movement of the rod 88, closes the slot 3 with the elastic member 16 to block the air flow. Information is then recorded on or reproduced from the inserted optical card 2 by an optical head (not shown) in the apparatus.

After recording or reproducing information on or from the optical card 2 is completed, the optical card 2 is to be ejected. This process is performed in the reverse order of the inserting process, thus omitting the explanation.

The shutter 8 is pressed against the elastic member 16 by the force of the coil springs 64 when closing the slot 3. The air flow can be blocked so as to surely prevent dust from being carrying in the apparatus.

Figure 11:
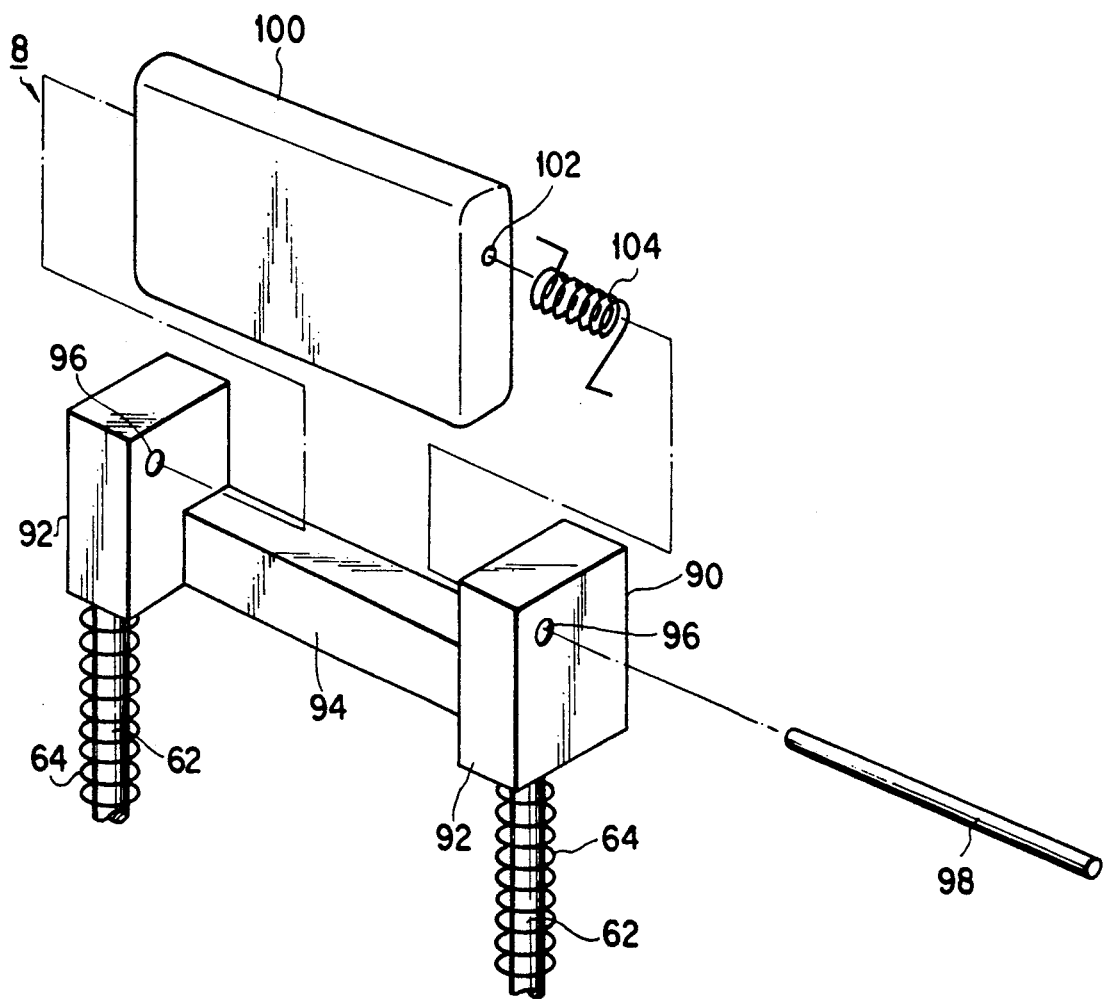
FIG. 11 is a perspective view of the shutter mechanism shown in FIG. 9.
Figure 12:
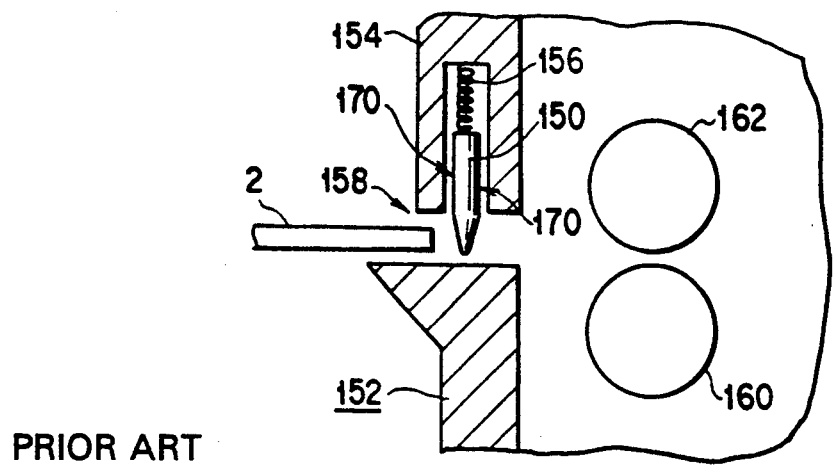
FIG. 12 is a partial cross section of a slot section in a prior art information recording/reproducing apparatus disclosed in the second publication.
Figure 13:
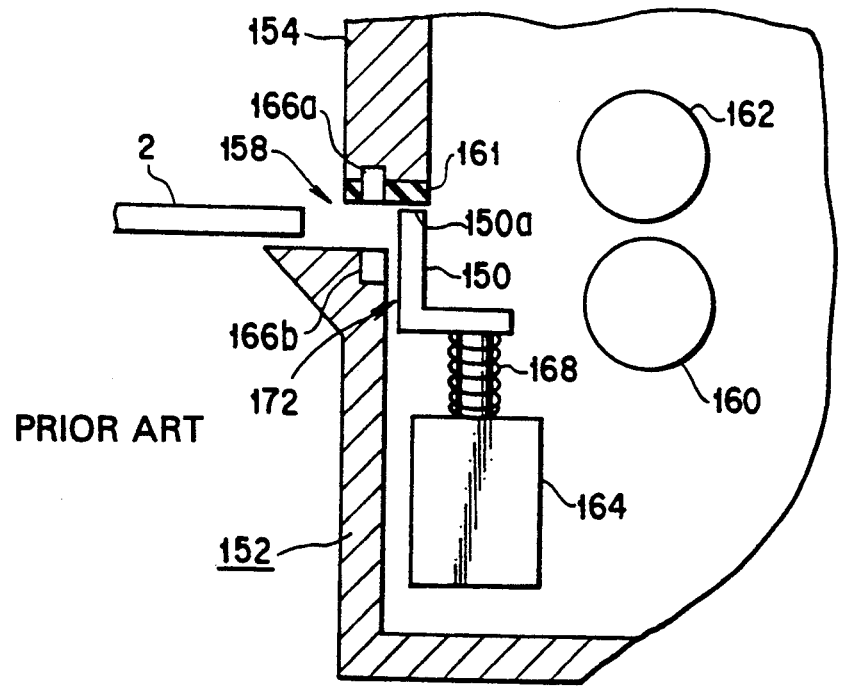
FIG. 13 is a partial cross section of a slot section in a prior art information recording/reproducing apparatus disclosed in the third publication.

A modification of the second embodiment will now be described referring to FIGS. 9 and 11.

A shutter in this modification is constituted by multiple members, differing from the shutter consisting of one member in the second embodiment.

A first shutter member 90 has two side walls 92 which are coupled to each other by a proximal end 94 at the respective corners. Corners opposed to the respective coupled corners by the proximal end 94 each have a hole 96. The holes 96 are coupled to through holes 102 which are formed on the respective lengthwise side of a second shutter member 100 made of a rectangular thin plate. The second shutter member 100 is provided rotatable to the first shutter member 90.

First coil springs 104 are located respectively between the holes 96 and the through holes 102 through pins 98. The second shutter member 100 is urged to the proximal end 94 of the first shutter member 90 counterclockwise from the view of FIG. 11. As a result, the second shutter member 100 always faces in the perpendicular direction.

On the bottom surfaces of the side walls 92 are each provided the leg portions 6 and the coil springs 64 of the shutter 8 as in the second embodiment. The rod 88 is formed on the rear surface of the distal end 94 as well as that of the shutter 8 in the second embodiment. A set of the leg portions 62 and the coil springs 64, and the rod 88 are engaged with the guides 66 of the base plate 68 and the first notch 84 of the lever 80, respectively, so that the shutter 8 shown in FIG. 11 as well as that in the second embodiment is coupled to the solenoid 18. The rod 88 on the rear surface of the base plate 68 is not shown in FIG. 11 to simplify the diagram.

Figure 9:
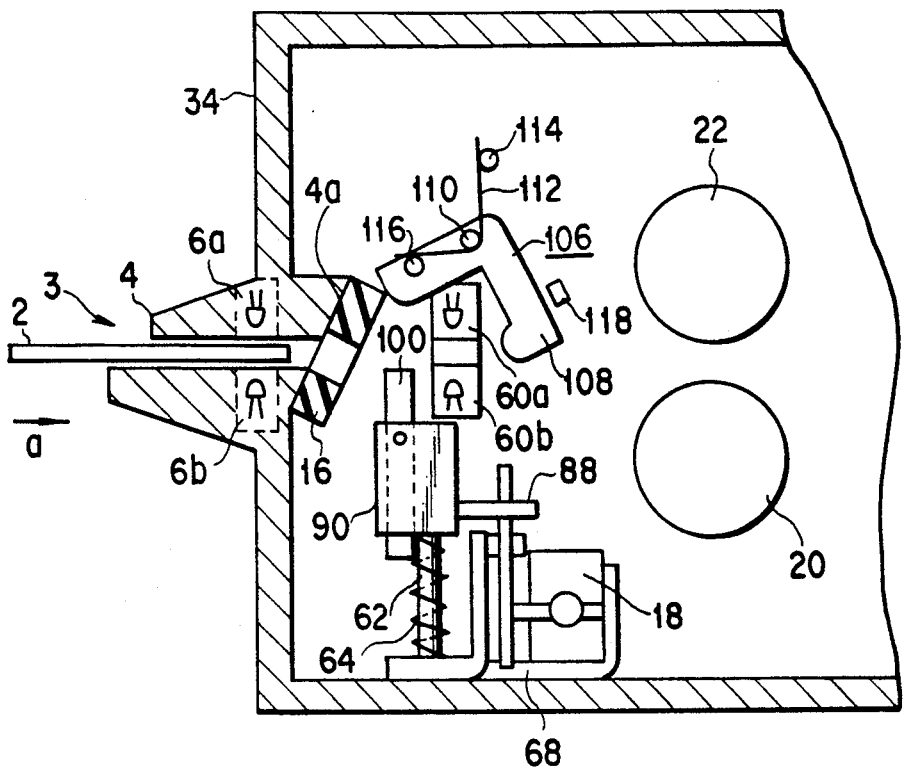
FIG. 9 is a partial cross section showing a modification of the shutter mechanism in the apparatus according to the second embodiment with the shutter being opened.
Figure 10:
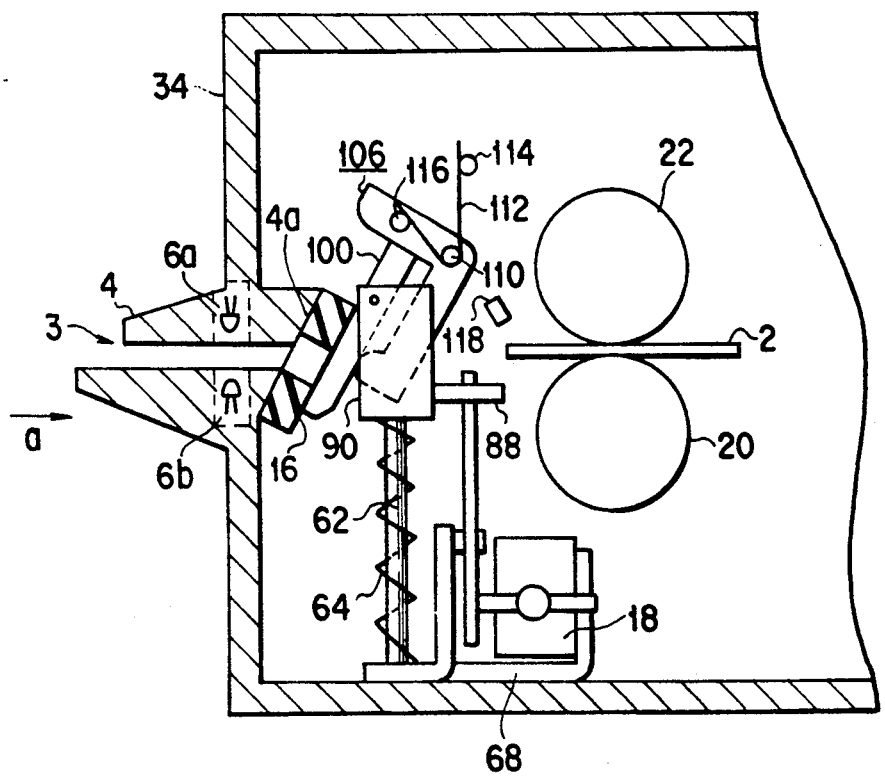
FIG. 10 is a partial cross section illustrating the shutter shown in FIG. 9 being closed.

As shown in FIGS. 9 and 10, a pressing member 106 is disposed above the first and second shutter members 90 and 100 in the housing 34. This pressing member 106 is bent at the center portion. The pressing member 106 has a protruding abut portion 108 formed at one end, and has a rotational center shaft 110 formed o either side of the bent portion. The rotational center shafts 110 are supported rotatable on both side walls (not shown) of the inner housing 34, making the pressing member 106 rotatable.

A second coil spring 112 is provided on each rotational center shaft 110. This coil spring 112 has urging force greater than that of the first coil spring 104 and sufficiently smaller than that of the coil spring 64.

Both ends of the second coil spring 112 respectively abut on a first stopper 114 formed on the inner housing 34 and on a second stopper 116 formed on the side of the other end of the pressing member 106, urging the pressing member 106 counterclockwise. A third stopper 118 is formed on one side wall (not shown) of the inner housing 34 to restrict this urging force. The third stopper 118 restricts the counterclockwise rotational of the pressing member 106 caused by the second coil spring 112. The other structure is the same as that of the apparatus according to the second embodiment.

The action of this modification will now be described.

With the slot 3 closed as shown in FIG. 10, no current flows in the solenoid 18 and the first shutter member 90 is pushed upward by the urging force of the coil spring 64. As the top surface of the second shutter member 100 abuts on the inner surface of one end of the pressing member 106, the pressing member 106 rotates clockwise around the rotational center shaft 110 against the urging force of the second coil spring 112. Consequently, the abut portion 108 at the other end portion of the pressing member 106 presses the center portion of the second shutter member 100 against the slot 3 via the elastic member 16, thereby blocking the air flow from the slot 3.

With the slot 3 closed in this condition, when the optical card 2 is inserted in the direction of the arrow a from the slot 3, the first photointerrupters 6a and 6b detect the insertion of the optical card 2, and excite the solenoid 18 via the predetermined circuit to activate the motor (not shown) which drives the feed roller 20.

The solenoid 18, when excited, attracts the core 74 and pulls a rod 88 of the second shutter member 100 through an operation similar to the one performed in the second embodiment. The first shutter member 90 is then pulled downward against the urging force of the spring coil 64. The second shutter member 100 is disengaged from the pressing member 106, and rotates counterclockwise due to the urging force of the first coil spring 104, facing in the vertical direction.

The pressing member 106 rotates counterclockwise due to the urging force of the second coil spring 112, its rotation restricted by the third stopper 118. When the second photointerrupters 60a and 60b detect the completion of the insertion of the optical card 2, they stop exciting the solenoid 18 via the predetermined circuits.

The solenoid 18 thrusts the core 74 forward to push the first shutter member 90 upward due to the urging force of the coil spring 64. Since the urging force of the coil spring 64 is sufficiently greater than that of the second coil spring 112, the top surface of the second shutter member 100 abuts against the inner surface of one end of the pressing member 106 to rotate the pressing member 106 clockwise. The abut portion 108 at the other end portion of the pressing member 106 rotating around the rotational center shaft 110 abuts on the center portion of the second shutter member 100 to press the second shutter member 100 against the elastic member 16 by the urging force of the second coil spring 112.

The second shutter member 100 presses the elastic member 16 in cooperation with the first shutter member 90 and pressing member 106 in the described manner, thereby blocking air from the slot 3 and preventing dust from entering the interior of the apparatus. Since the subsequent operation of recording or reproducing information on or from the optical card 2 is the same as done in the second embodiment, and the operation of the shutter at the time the optical card 2 is discharged is the same as the above-described shutter opening operation, their descriptions will be omitted here.

The present invention is not limited to the above-described embodiments and their modifications, but may be modified in various other manners within the scope and spirit of the invention. For instance, while the inclined surfaces 4a and 8a and the elastic member 16 are provided in the first and second embodiments, the arrangement may be modified to need only the elastic member 16 or the inclined surfaces 4a and 8a.

Although the foregoing description of the embodiments has been given of the apparatus which can perform both information recording and reproduction, the present invention may be applied to the type which has only one of the functions.

In short, the information recording/reproducing apparatus according to the present invention ca block the air flow into the interior of the housing to prevent dust from entering the same, thus improving the dustproof effect.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. Information recording/reproducing apparatus provided with a shutter mechanism for closing and opening an insertion slot formed on a wall of a housing to insert/eject an information recording medium into/from said housing, said shutter mechanism comprising:

a first member movable in a first direction perpendicular to a second direction in which said information recording medium is inserted into said slot of said housing, said first member being movable between a slot open position and a slot closed position;

a second member fixed on said housing and having said slot extending completely therethrough, and selectively either contacting said first member in said slot closed position or being spaced away from said first member in said slot open position; and a slanted surface which is slanted or inclined with respect to said first and second directions, said slanted surface being formed on said first member, and a slanting portion being formed on said second member such that said first and second members contact each other on said slanted surface and slanting portion around a periphery of said slot when said first member is in said slot closed position, to form a seal for preventing entry of dust or foreign objects into said housing when said first member is in said slot closed position.

2. The apparatus of claim 1, further comprising a seal member made of elastic material fixed to said slanted surface for sealing said slot when said slot is closed.

3. The apparatus of claim 1, wherein said slanted surface has a recess formed therein, said recess having a surface substantially perpendicular to said second direction, so as to effectively block entry of an information recording medium when said slot is closed.

4. The apparatus of claim 1, further comprising card detecting means for generating a detection signal responsive to detecting a pressure of an information recording medium in said slot.

5. The apparatus of claim 4, further comprising means coupled to said housing and which is responsive to said detection signal to drive said first member in said first direction from said slot closed to said slot open position.

6. The apparatus of claim 1, wherein said slanted surface is formed on both of said first and second members, said first and second members contacting each other on said slanted surfaces.

7. The apparatus of claim 6, further comprising a solenoid fixed to said housing and which drives said first member in said first direction from said slot closed to said slot open position.

8. The apparatus of claim 6 further comprising an elastic seal member fixed to one of said slanted surfaces for sealing said slot when said slot is closed.

9. The apparatus of claim 6, wherein said slanted surface has a recess formed therein, said recess having a surface substantially perpendicular to said second direction, so as to effectively block entry of an information recording medium when said slot is closed.

10. The apparatus of claim 1, further comprising a solenoid fixed to said housing and which drives said first member in said first direction from said slot closed to said slot open position.

* * * * *